Aug. 9, 1927.　　　　　　　　　　　　　　　　　　　　1,638,434
G. O. CURME, JR., ET AL
GAS APPARATUS
Filed June 15, 1922
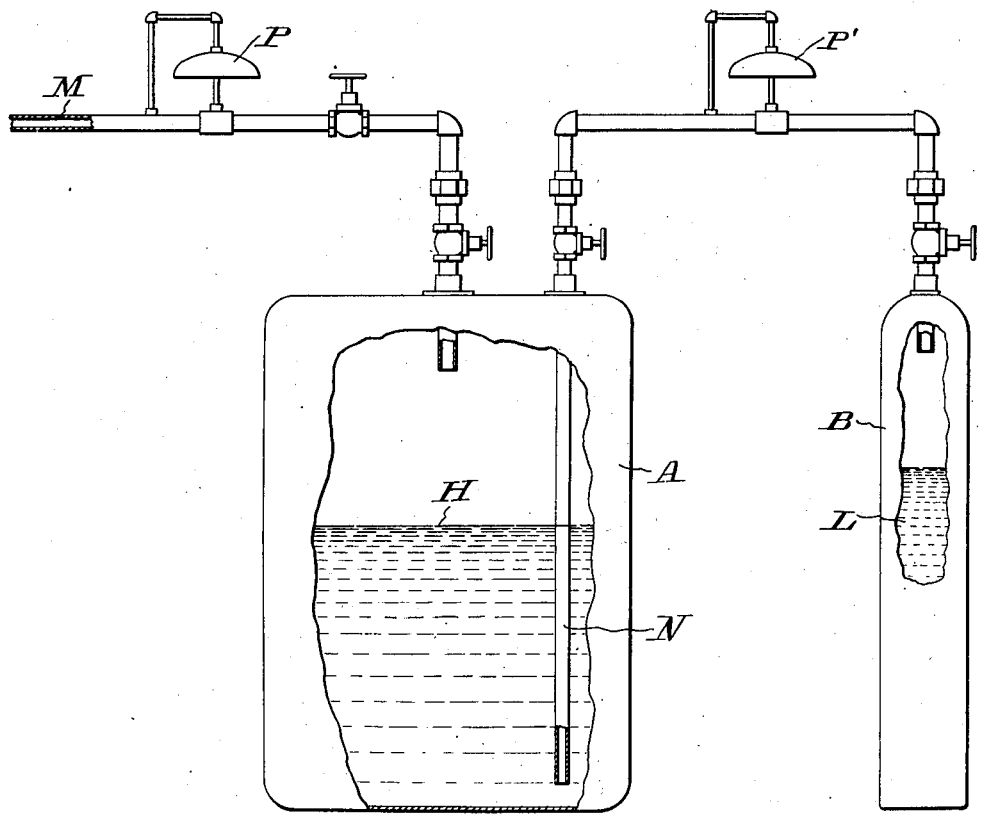

Patented Aug. 9, 1927.

1,638,434

UNITED STATES PATENT OFFICE.

GEORGE O. CURME, JR., AND HAROLD E. THOMPSON, OF CLENDENIN, WEST VIRGINIA, ASSIGNORS TO CARBIDE AND CARBON CHEMICALS CORPORATION, A CORPORATION OF NEW YORK.

GAS APPARATUS.

Application filed June 15, 1922. Serial No. 568,580.

It is possible to generate a fuel gas, suitable for heating, lighting and power, and to deliver it to the point of use at a practically constant pressure, by merely compressing into a container an appropriate volatile combustible material and connecting the container to the fuel main through a reducing valve of well-known design. In order to get an acceptable quantity of material into the container, the material must be liquefiable at permissible pressures.

A system of this kind is subject to certain serious disadvantages, of which the following may be noted:

Since spontaneous evaporation is depended on to generate the fuel gas, and since the container or piping is practically certain to be subjected to widely differing temperatures, the combustible liquid material must have at the lowest temperature to which any part of the system may be subjected, a vapor pressure at least equal to that desired in the main. This results in a very limited choice of suitable materials. Any attempt to render available for such use materials which do not of themselves possess sufficient volatility, by mixing such materials with more volatile substances, is apt to result in a fractional distillation of the contents of the container, leaving a non-volatile residue therein, so that the admixed non-volatile material does not generate fuel gas but becomes an inert and useless burden in the system. With mixtures of this kind, the composition of the gas generated may vary markedly according as a fresh or a nearly exhausted container is in use.

Any combustible material which is of sufficient volatility will have a high vapor pressure at elevated atmospheric temperatures, making necessary the use of special containers for its shipment and storage. This is equally true whether the material is a single chemical compound or a mixture.

We have invented a system, now to be described, for generating fuel gas from a liquid, wherein the above described disadvantages are very largely avoided. Our invention comprises the use of at least two combustible materials of differing volatility, stored in separate vessels; the vessels and the main being connected through regulating valves in such a way that the less volatile material is selectively consumed at times when its volatility is sufficient, whereas, when conditions less favorable to the evaporation of the less volatile material set in, the more volatile material is drawn on to supply the deficiency of gas generated.

In the example a constant barometric pressure will be assumed.

A specific embodiment of the invention will now be described in connection with the accompanying drawing, which is shown in elevation with parts in vertical section.

A is a container or receptacle wherein is a body of material H, the vapor pressure of which preferably becomes equal to the pressure desired in the main M at some temperature intermediate the highest and lowest temperatures to which the system may be subjected. Let this temperature be represented by $t_0$, and the vapor pressure of material H at this temperature be $p_0$.

The pressure reducing valve P is so adjusted that it establishes communication between container A and the main M whenever the pressure in M falls below $p_0$.

B is a second container or receptacle in which is stored the more volatile substance L, which may be in the form of either liquid or gas. A second pressure reducing valve P' is set to permit gas from B to pass to the outlet or nozzle N only when the pressure in A falls to a value less than $p_1$, $p_1$ being higher than $p_0$. Let $t_1$ represent the temperature at which the vapor pressure of liquid H is equal to $p_1$. The nozzle N is, as shown, below the surface of the liquid H at all times. The material L is so chosen that its vapor pressure exceeds $p_1$ (and hence $p_0$) at all temperatures to which the system may be subjected.

It will be apparent that at all temperatures above $t_1$, the valve P' will remain closed and none of the material L will be consumed. The liquid H will have a vapor pressure greater than $p_0$ and gas will be fed into the main M only at such a rate as to replace the gas drawn off for use, the pressure in the main being held constant at $p_0$.

Should the temperature fall below $t_1$, the valve P' will begin to open and gas will flow from container B into container A. So long as the temperature is not much less than $t_1$, not much gas will flow through valve P', and only a little of the material L will be consumed, as the liquid H will still furnish most of the gas passing to the main. Upon further depression of the temperature, material L will be consumed at an increasing rate. Since the pressure in A cannot fall below $p_1$, the pressure in M cannot fall below $p_0$ so long as any of material L remains.

It should be noted that the system does not consume the two materials separately and alternately as external conditions vary. After the first opening of valve P', the two materials will be consumed concurrently. The material L when injected into the body of material H will activate the latter in such a way that the vapor passing to the main will at all times contain considerble proportions of the material H, carried over with the vapor of the more volatile material L.

For example, for a warm climate the liquid H may be normal butane boiling at about the centigrade zero, while L may be propane boiling at about $-44°$ C. The vapor pressure of the butane will then suffice until the temperature falls nearly to zero and the valve P' can be so adjusted that the propane will not be drawn on until that condition arises.

During periods when the propane is being released from container B, the composition of the liquid in A will change to some extent, as some propane will dissolve in it instead of merely bubbling through. This will depress the temperatures $t_0$ and $t_1$ slightly, but there will always be an interval between these temperatures and the system will continue to function exactly as before without any readjustment of the valves.

It will be understood that either of the materials H and L may be a mixture. This does not in any way alter the manner of operation. Liquid H might include not only butane but pentane, hexane and higher paraffins, together with any olefine, aromatic, alicyclic or other compounds of suitable volatility. Material L might be ethane, propylene, ethylene or other highly volatile combustible material, or any mixture of such materials.

With a system such as described above it is possible to overcome all the serious disadvantages noted in connection with a system using a single volatile combustible material. A much wider range of materials becomes available, and mixtures may be used, avoiding the necessity of the isolation of single compounds or practically constant boiling mixtures. A regular generation of gas may be assured over practically any desired temperature range, and regardless of the extent to which the charge of less volatile liquid has been consumed. The less volatile liquid may have so low a vapor pressure that it can be shipped in tank cars, and the materials may be so chosen that the more volatile material, which will naturally require more care in its handling, will be used in relatively small amount.

The system also gives a high degree of flexibility in that it is not necessary to renew the charges of both materials simultaneously, either one or the other being renewed with greater frequency according to the particular conditions under which the system is being used.

In the modification described, the vapor of material L must pass through liquid H to reach the main. This is not absolutely necessary, but it reduces fluctuations in the composition of the gas produced and gives a better utilization of the material H, and for this reason is preferred.

The invention is subject to many modifications, and its scope is defined only by the appended claims.

We claim:

1. In apparatus for producing fuel gas, in combination, a main; a receptacle; a passage joining the main with the receptacle; a valve arranged to open the passage when the pressure in the main falls below a predetermined value; a second receptacle; a second passage joining the second receptacle with the first receptacle; and a second valve arranged to open the second passage when the pressure in the first receptacle falls below a second predetermined pressure lower than the first.

2. In apparatus for producing fuel gas, in combination, a main; a receptacle; a passage joining the main with the receptacle; a valve arranged to open the passage when the pressure in the main falls below a predetermined value; a nozzle in the lower part of the receptacle; a second receptacle; a second passage joining the second receptacle with the nozzle; and a second valve arranged to open the second passage when the pressure in the first receptacle falls below a second predetermined pressure lower than the first.

In testimony whereof, we affix our signatures.

GEORGE O. CURME, JR.
HAROLD E. THOMPSON.